United States Patent [19]
Kim

[11] Patent Number: 5,912,953
[45] Date of Patent: Jun. 15, 1999

[54] METHOD FOR RECEIVING DOCUMENT BY FACSIMILE IN TELEPHONE MODE

[75] Inventor: Young-Ki Kim, Gumi, Rep. of Korea

[73] Assignee: SamSung Electronics Co., Ltd., Suwon, Rep. of Korea

[21] Appl. No.: 08/777,139

[22] Filed: Dec. 30, 1996

[30] Foreign Application Priority Data

Dec. 30, 1995 [KR] Rep. of Korea ...................... 95-67762

[51] Int. Cl.⁶ .......................... H04M 11/00; H04N 1/32
[52] U.S. Cl. .................................. 379/100.15; 358/468
[58] Field of Search ............................ 379/90.01, 93.09, 379/93.11, 100.09, 100.14–100.16, 110.01, 100.01; 358/400, 468

[56] References Cited

U.S. PATENT DOCUMENTS

| | | | |
|---|---|---|---|
| 4,856,053 | 8/1989 | Hashimoto | 379/100.01 |
| 5,333,179 | 7/1994 | Yamamoto et al. | 379/100.16 |
| 5,487,105 | 1/1996 | Sakai | 379/100.15 |
| 5,508,824 | 4/1996 | Baba | 379/100.14 |
| 5,517,556 | 5/1996 | Pounds et al. | 379/100.06 |
| 5,517,557 | 5/1996 | Tanaka | 379/93.09 |
| 5,532,840 | 7/1996 | Asano et al. | 379/100.01 |
| 5,544,234 | 8/1996 | Terajima et al. | 379/100.16 |
| 5,715,302 | 2/1998 | Lee | 379/100.16 |

*Primary Examiner*—Paul Loomis
*Assistant Examiner*—George Eng
*Attorney, Agent, or Firm*—Robert E. Bushnell, Esq.

[57] ABSTRACT

A method for receiving a document, when a facsimile unit for document transmission/reception is in a telephone mode, may include the step of detecting whether it gets dark by the use of a sensor for detecting light. The method may also include the step of automatically converting the telephone mode of the facsimile unit into a facsimile mode for document reception, if the sensor determines either that the absence of light has continued or that the absence of light continues for a predetermined period of time.

16 Claims, 3 Drawing Sheets

METHOD FOR RECEIVING DOCUMENT BY FACSIMILE IN TELEPHONE MODE

This application makes reference to, incorporates the same herein, and claims all benefits accruing under 35 U.S.C § 119 from an application entitled Method for Receiving Document by Facsimile in Telephone Mode earlier filed in the Korean Industrial Property Office on Dec. 30, 1995, and there duly assigned Ser. No. 67762/1995 by that Office.

BACKGROUND OF THE INVENTION

1. Field of the Invention

The present invention relates to a facsimile unit. More particularly, the present invention relates to a method for receiving a document by using a facsimile unit that is in a telephone mode when a user is absent.

2. Description of the Related Art

A facsimile unit generally accommodates a telephone mode and a facsimile mode, permitting a user to alternate between the two modes. Once a conventional facsimile unit is in facsimile mode even if a user is absent, messages may be automatically received and printed at the facsimile unit. In contrast to that of the facsimile mode, when the telephone mode is established, the user cannot receive incoming messages unless he is at his desk at the time. Thus, if the facsimile unit is in telephone mode, incoming messages can not be received.

On this matter, among the exemplars of the contemporary practice, Terajima et al. (U.S. Pat. No. 5,544,234, *Facsimile Apparatus With Automatic Answering Telephone Function, And Communication Method In Said Apparatus*, Aug. 6, 1996) discusses a facsimile apparatus with automatic answering telephone function and communication method in said apparatus. Asano et al. (U.S. Pat. No. 5,532,840, *Facsimile Machine*, Jul. 2, 1996) discusses facsimile machine in which voice data and image data can be stored in a semiconductor memory. Tanaka (U.S. Pat. No. 5,517, 557, *Facsimile Apparatus With Automatic Telephone Answering Function*, May 14, 1996) discusses a facsimile apparatus with automatic telephone answering function, which comprises a ring signal detection circuit, a detection circuit, an interface circuit, a telephone portion, a facsimile portion, a storing circuit, and a control circuit. Pounds et al. (U.S. Pat. No. 5,517,556, *Call Processing System With Facsimile Processing*, May 14, 1996) discusses a telephone call processing apparatus for processing facsimile messages, which has a message control system including a voice control unit, control processor unit, and a telephone line card. From my study of these exemplars and of the prior art, I believe that there is a need for an effective and improved document reception obviates problems in the art, as is done in the present invention.

SUMMARY OF THE INVENTION

Accordingly, an object of the present invention is to provide a document reception method for a facsimile unit in telephone mode which substantially obviates the above-described problem due to limitations and disadvantages of the related art.

It is an object of the present invention to provide an improved method for receiving a document by using a facsimile unit which is in telephone mode When a uses is absent.

It is another object of the present invention to provide a method for automatically converting a telephone mode of a facsimile unit into a facsimile mode for document reception according to circumstances an ambient light.

In order to realize one or more of the above objects, the present invention provides a method for receiving a document when a facsimile unit for document transmission/reception is in a telephone mode, including the steps of: detecting an ambient light of the facsimile unit using a sensor for detecting light; and automatically converting a telephone mode of the facsimile unit into a facsimile mode for document reception if the sensor determines that the absence of ambient light continues for a predetermined time period.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
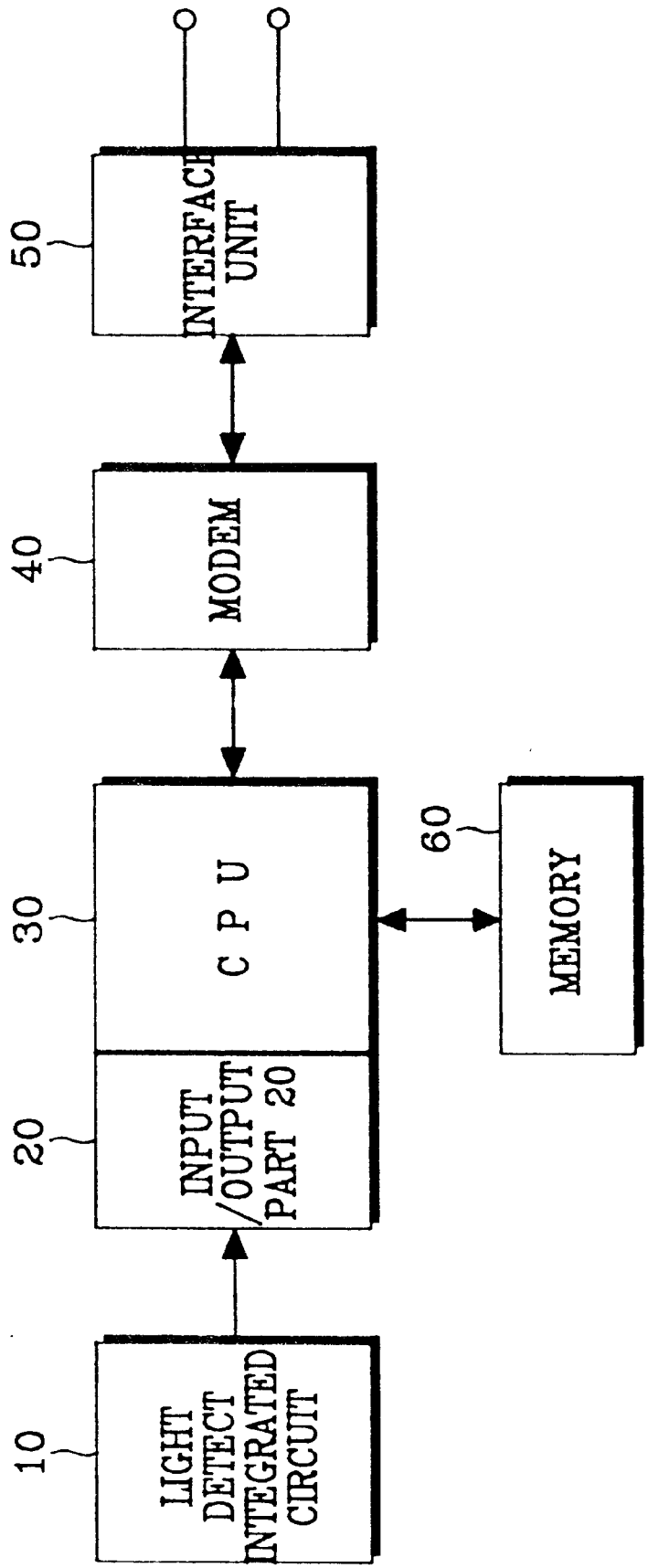
FIG. 1 is a block diagram of a facsimile unit built in accordance with the principles of the present invention.

Reference will now be made in detail to the preferred embodiment of the present invention, examples of which are illustrated in the accompanying drawings. Like reference numerals designate like reference parts throughout the specification and drawings.

FIG. 1 is a block diagram of a facsimile unit in accordance with the present invention. The inventive facsimile unit includes a light detection integrated circuit 10 (e.g. OPIC by Sharp) which senses the variation of ambient light to produce a prescribed signal, an input/output part 20 which receives the output signal of the light detection integrated circuit 10, and a central processing unit 30 which controls the overall actions of the facsimile unit according to a predetermined program. An interface unit 50 interconnects and provides compatibility between CPU 30 and peripherals in the facsimile unit to receive a ring signal from a central exchange. The facsimile unit also includes a modem (modulator/demodulator) 40 which converts an analog signal from the interface unit 50 into a digital signal, and converts a digital signal from the CPU 30 into an analog signal, and a memory 60 which temporarily stores input data under the control of CPU 30 when the facsimile unit either runs out of paper or is in a predetermined mode.

Figure 3:
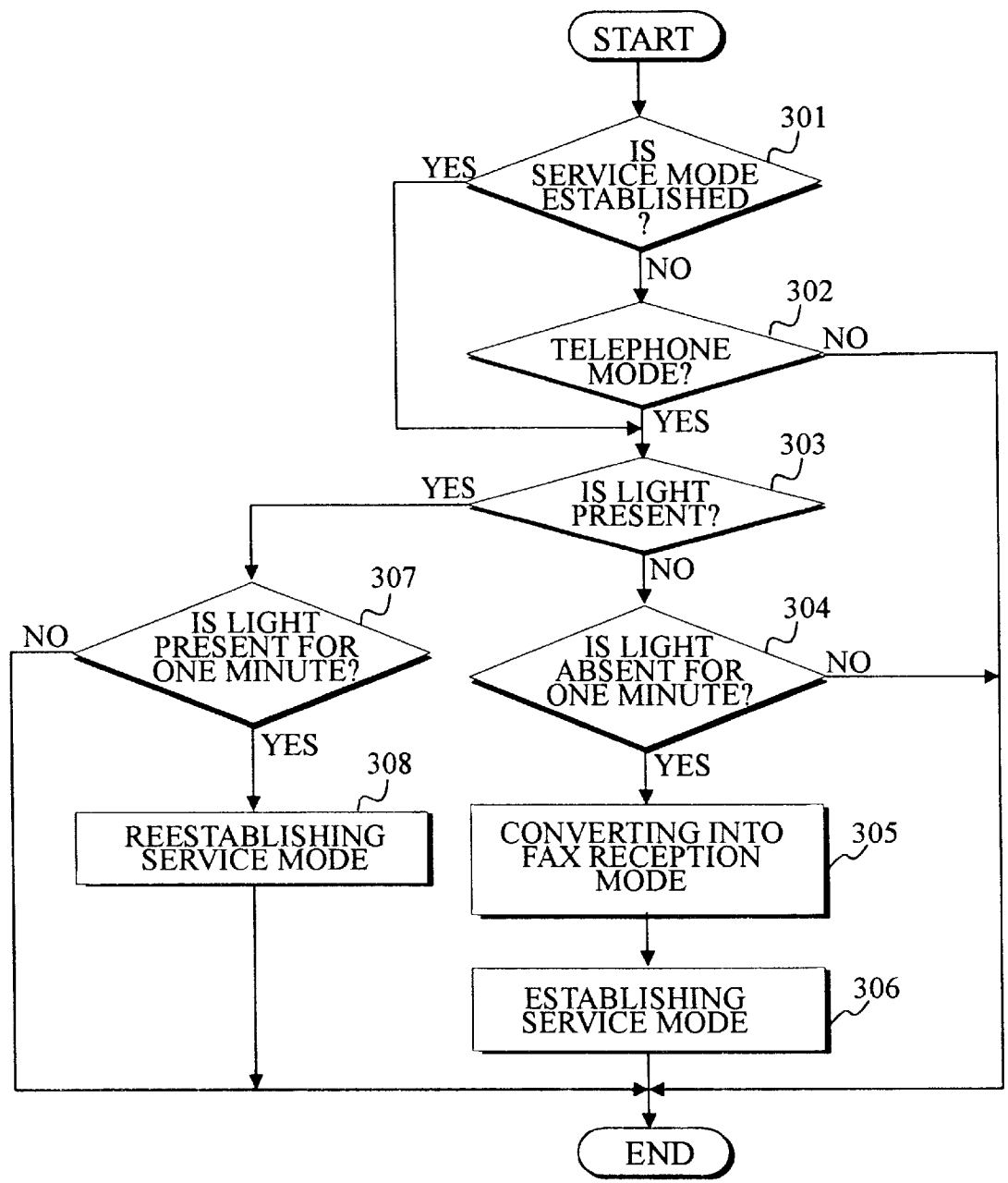
FIG. 3 shows a flow chart for describing another operation of the facsimile unit built in accordance with the principles of the present invention.

FIG. 3 shows a flow chart for describing the operation of the facsimile unit in accordance with the present invention. Referring to FIGS. 1 and 3, the output level of light detection integrated circuit 10 varies with ambient light of the facsimile unit. For example, as the room gets darker or lighter, the output level varies. CPU 30 reads and judges the state, of the ambient light using and via input/output part 20. When CPU 30 checks (step 303) the state of the ambient light and senses the absence of ambient light supplied from outside, CPU 30 determines (step 304) whether the absence of ambient light continues for a predetermined time period, such as one minute, and permits (step 305) the facsimile unit to be converted automatically in a facsimile reception mode.

Once CPU 30 determines (step 307) that the presence of light continues for one minute, it establishes (step 308) another service mode. In this manner, CPU 30 controls the mode conversion of the facsimile unit according to the state of light supply from outside. Thus, if CPU 30 does not sense any supply of light after the light of the office has been turned off, it allows a telephone mode of the facsimile unit to be automatically converted into a facsimile reception mode.

As described above, the present invention enables a user to receive documents by the use of a facsimile unit which is in telephone mode during his absence. In addition, once there is a change in supply of light during a telephone mode of the facsimile unit, the present invention ensures an automatic mode conversion into a facsimile mode for document reception.

Figure 2:
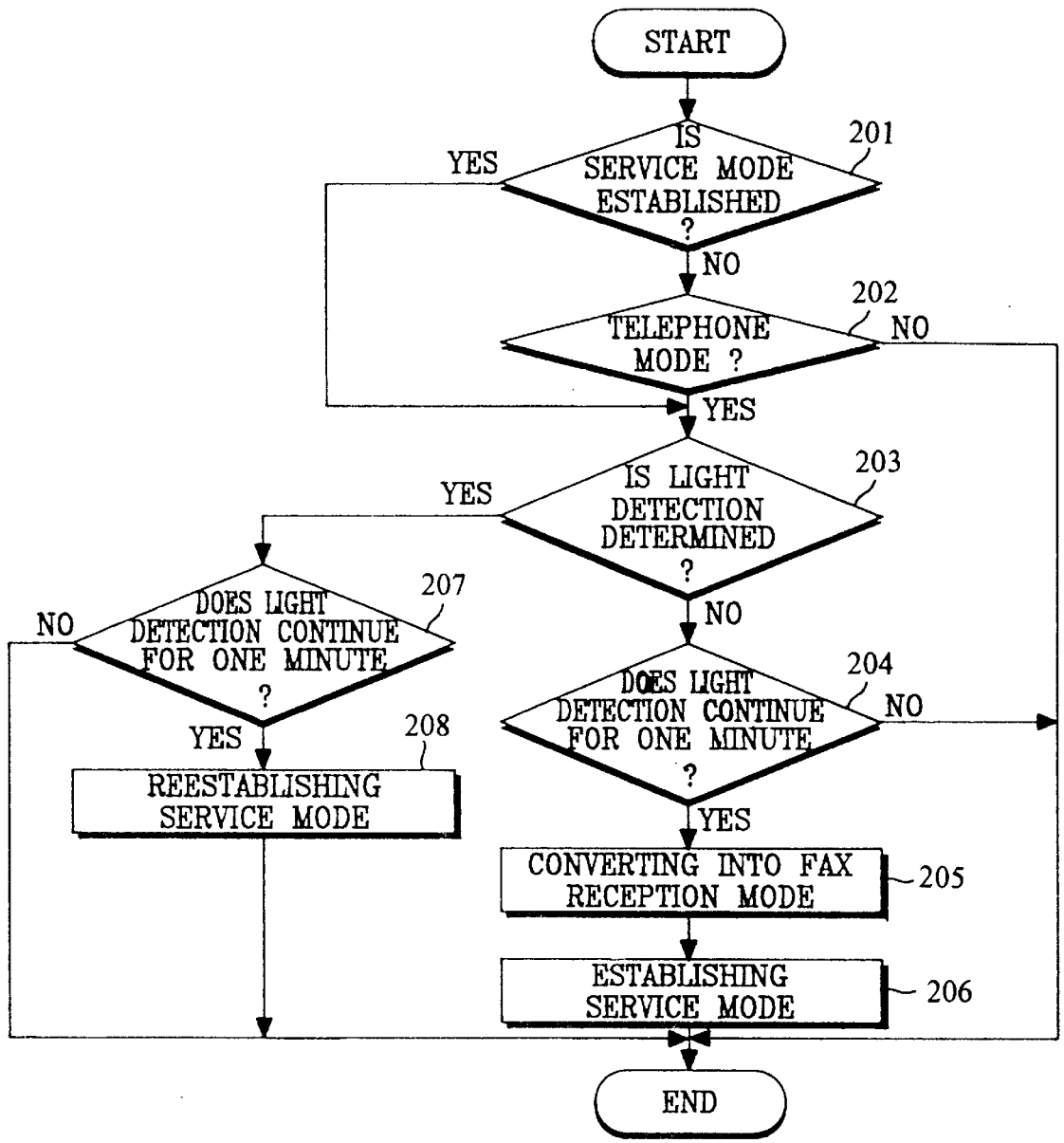
FIG. 2 shows a flow chart for describing an operation of the facsimile unit built in accordance with the principles of the present invention.

FIG. 2 shows a flow chart for describing the operation of the facsimile unit in accordance with an alternative embodiment of the present invention. At step 203, the facsimile unit checks whether the light detection has been determined. Also, the facsimile unit checks whether the light detection continues for a predetermined time period, such as one minute (step 204 and step 207). If the light detection has not been determined, the facsimile unit is converted into a facsimile reception mode (step 205) before establishing the service mode (step 206).

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for determining whether a facsimile system is to receive a facsimile transmission, comprising the steps of:

determining whether a service mode is established for automatic conversion of an operational mode of the facsimile system in dependence of an ambient light in the vicinity of the facsimile system;

when said service mode is not established, then determining whether a telephone mode for reception of voice transmissions is established;

when said telephone mode is established, then determining whether a level of ambient light equal or greater than a predetermined level of light has been maintained for a first predetermined period of time;

when said level of ambient light has been maintained for said first predetermined period of time at equal to or greater than said predetermined level of light, then establishing said service mode;

determining whether said level of ambient light has been maintained as less than said predetermined level of light for a second predetermined period of time; and when said level of light has been maintained at less than said predetermined level of light for said second predetermined period of time, then converting the facsimile system to a facsimile reception mode for reception of facsimile transmission;

wherein the facsimile system comprises:

a light detection integrated circuit sensing variation of light and producing a prescribed signal;

an input/output unit that receives said prescribed signal of the light detection integrated circuit;

a central processing unit connected to said input/output unit, said central processing unit controlling actions of the facsimile and telephone machine according to a predetermined program;

a modem connected to said central processing unit;

an interface unit receiving a ring signal from outside of the facsimile system, said interface unit connected to said modem; and a memory connected to said central processing unit and temporarily storing data of said central processing unit when the facsimile system either runs out of paper or is in a predetermined storing mode.

2. A method for automatically converting an operational mode of a facsimile system between a telephone reception mode and a facsimile reception mode, said method comprising the steps of:

determining whether a service mode is established for automatic conversion of an operational mode of the facsimile system to the facsimile reception mode in dependence upon an ambient light in a vicinity of the facsimile system;

when the service mode is established, determining whether a level of said ambient light reaches a predetermined level of light;

after the level of ambient light reaches the predetermined level of light, determining whether the level of ambient light is maintained for a first predetermined time period;

when the level of ambient light is maintained at least for said first predetermined time period, re-establishing the service mode;

when the level of ambient light does not reach the predetermined level of light, determining whether the level of ambient light is maintained as less than the predetermined level of light for a second predetermined time period; and when the level of ambient light is maintained as less than the predetermined level of light for said second predetermined time period, automatically converting the operational mode of the facsimile system to said facsimile reception mode enabling reception of a facsimile transmission.

3. The method of claim 2, wherein the level of ambient light is also determined when the facsimile system operates in a telephone reception mode and the service mode is not established.

4. The method of claim 2, further comprised of establishing the service mode after the operational mode of the facsimile system has been converted into the facsimile reception mode.

5. The method of claim 2, further comprised of said first predetermined time period and said second predetermined time period each corresponding to one minute.

6. The method of claim 2, further comprised of determining whether the facsimile system operates in the telephone reception mode when the service mode is not established, and then determining whether the level of ambient light reaches the predetermined level of light when the facsimile system operates in the telephone reception mode.

7. The method of claim 6, further comprised of terminating conversion of the operational mode of the facsimile system into the facsimile reception mode, when the facsimile system does not operate in the telephone reception mode.

8. The method of claim 2, further comprised of terminating conversion of the operational mode of the facsimile system into the facsimile reception mode, when the level of ambient light is not maintained as exceeding the predetermined level of light for said first predetermined time period.

9. The method of claim 2, further comprised of terminating conversion of the operational mode of the facsimile system into the facsimile reception mode, when the level of ambient light is not maintained as less than the predetermined level of light for said second predetermined time period.

10. The method of claim 2, wherein the facsimile system comprises:
- a light sensor for sensing variation of the ambient light and generating a prescribed signal;
- a central processing unit for controlling operational actions of the facsimile system according to a predetermined program;
- an interface unit for receiving a ring signal from a central exchange; and
- a modem disposed between the central processing unit and the interface unit; and
- a memory for temporarily storing input data of said central processing unit, when the facsimile either system first runs out of paper or is in a storage mode.

11. The method of claim 10, wherein the prescribed signal of said light sensor varies with the ambient light in a vicinity of the facsimile system originating from a source external to the facsimile system.

12. The method of claim 11, wherein said central processing unit judges the level of said ambient light and converts the operational mode into the facsimile reception mode.

13. The method of claim 1, wherein said first predetermined time period corresponds to approximately one minute.

14. The method of claim 1, wherein said second predetermined time period corresponds to approximately one minute.

15. A method for automatically converting an operational mode of a facsimile system into a facsimile reception mode, comprising the steps of:
- determining whether a service mode is established for automatic conversion from an operational mode into a facsimile reception mode;
- when the service mode is established, sensing whether there is an absence of light surrounding the facsimile system, and whether said absence of light continues for a predetermined time period; and
- when said absence of light continues for said predetermined time period, automatically converting the operational mode of the facsimile system into said facsimile reception mode accommodating reception of data while printing images corresponding to said data onto documents.

16. The method of claim 15, wherein said predetermined time period corresponds to at least one minute.

* * * * *